May 15, 1962 W. E. KOMINIC 3,034,206
VALVE INSERTING APPARATUS
Filed April 2, 1958 2 Sheets-Sheet 1
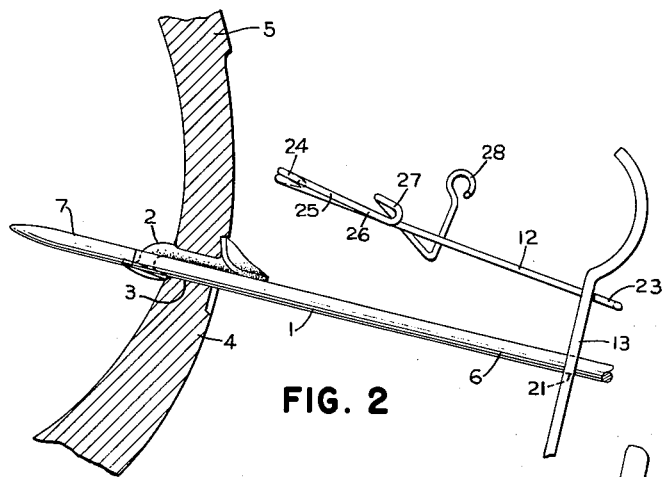
FIG. 2
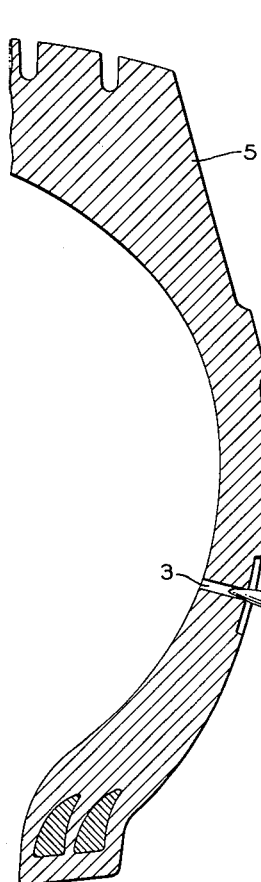
FIG. 1
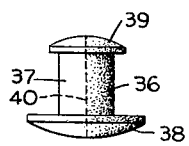
FIG. 5
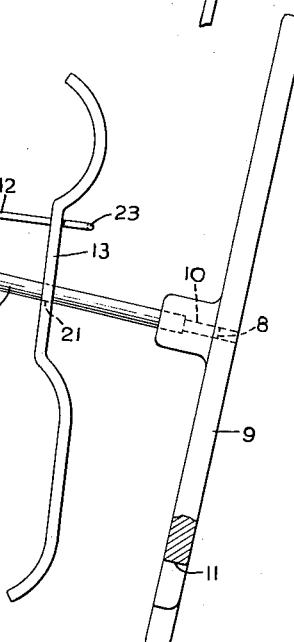
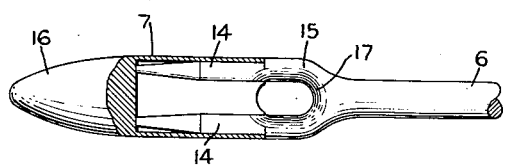
FIG. 6
FIG. 7
INVENTOR.
WALTER E. KOMINIC
BY
*P. L. Miller*
ATTORNEY May 15, 1962  W. E. KOMINIC  3,034,206
VALVE INSERTING APPARATUS
Filed April 2, 1958  2 Sheets-Sheet 2

INVENTOR.
WALTER E. KOMINIC
BY
*R. L. Miller*
ATTORNEY

United States Patent Office 3,034,206
Patented May 15, 1962

3,034,206
VALVE INSERTING APPARATUS
Walter E. Kominic, Cuyahoga Falls, Ohio, assignor to The Goodyear Tire & Rubber Company, Akron, Ohio, a corporation of Ohio
Filed Apr. 2, 1958, Ser. No. 725,867
9 Claims. (Cl. 29—213)

This invention relates to an apparatus for inserting elastomeric plug-type valves into the sidewall of a tire or similar article.

Recent improvements in tubeless tires generally and the reduction of the wheel rim size of automobiles have increased the demand for tires which utilize inflation valves mounted in the sidewalls. Such valves are not only useful in order to inflate multiple chamber safety tires but are becoming necessary due to the lack of room on the smaller modern wheel rim to accommodate a conventional metal valve. While elastomeric plug type valves are satisfactory when located in a tire sidewall, the insertion of the valve without damage to the valve or the sidewall of the tire has presented problems. This is particularly true in heavier, multiple-bead tires such as are used on trucks and aircraft. Since, in heavy duty tires, tougher rubbers are required due to higher stresses encountered in service, and the walls of such tires are less flexible than lighter single-bead tires, the task of inserting the valves in the tire sidewall is a much more difficult one.

It is a primary object of the present invention to provide an apparatus which permits the rapid and efficient insertion of elastomeric valves into tire sidewalls.

It is an additional object of the present invention to provide an apparatus for inserting sidewall valves which will minimize the risk of damage to the valve or tire during the insertion of the valve.

It is a still further object of the present invention to provide apparatus for inserting valves into tire sidewalls which is simple and yet capable of use with a variety of types of valves and tires.

These and other objects of the present invention will become obvious from the following description and drawings in which:

FIG. 1 illustrates a tool according to the present invention as used in an initial step of inserting a valve in a tire sidewall;

FIG. 2 illustrates a further step in inserting the valve;

FIG. 5 illustrates a typical elastomeric valve in a non-extended condition;

FIG. 6 is a detail of a portion of a valve inserting tool such as used in FIG. 1;

FIG. 7 is a further detail of the tool of FIG. 6;

Figure 3:
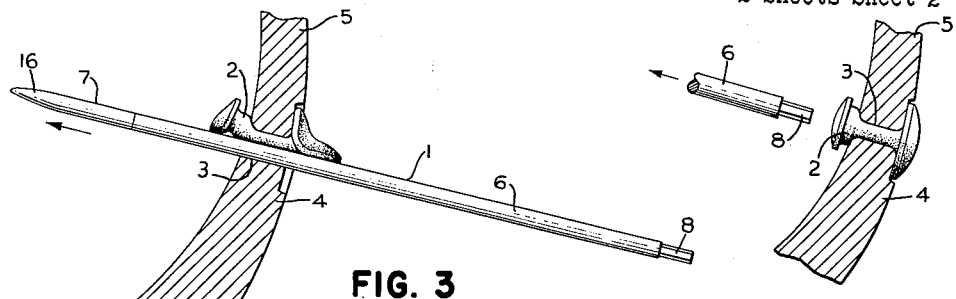
FIG. 3 illustrates a subsequent step in the valve insertion procedure.

As previously mentioned, the use of elastomeric plug-type valves in the sidewalls of tires has increased in recent times due to the invention of multi-chamber safety tires. In addition, because of the reduction in wheel rim size on automobiles and the consequent reduction of space for a conventional rim mounted valve, the use of sidewall mounted valves can be expected to increase even more rapidly in the future. Since the elastomeric plug valves ordinarily used rely on the peripheral pressure exerted by the tire sidewall to seal the narrow needle receiving slit down the valve center, the hole into which the valve is inserted is necessarily much smaller than the body of the valve itself. This presents a problem during the valve insertion, particularly where a stiff rubber is used as valve stock, since it is difficult to insert the valve without damaging it. Furthermore, one must exercise great care to avoid cutting or tearing the tire carcass since this may result in leaks about the valve periphery, insufficient compression on the valve to seal it shut, and in some cases a serious weakening of the tire carcass in the area adjacent the valve. The latter condition may result in tire failure due to flexing during service or expulsion of the valve due to the outward force on the valve from the inflating medium. These problems are avoided by the present invention which provides a method and apparatus permitting insertion of valves in the sidewalls of tires with ease and little risk of damage to the valve or tire carcass.

One form of tool for practicing the method of the present invention and designated generally by numeral 1 is illustrated in FIG. 1 as used to insert a valve 2 into a valve receiving opening 3 extending through the sidewall 4 of a tubeless tire 5. The tool comprises a relatively slender shaft portion 6 which is terminated at one end by a valve engaging tip 7 and at the other end by a shaped key portion 8. The shaft 6 is preferably of small enough cross-section to pass easily through the opening 3 even with a valve in place. The key 8 is releasably fitted into a handle 9 which has a hole cut in the central portion thereof to form a way 10 mating with the key 8 of the shaft 6. Handle 9 also is provided with a keyhole shaped slot 11 in one end thereof for purposes which will subsequently become clear. As illustrated in FIG. 1, the tool includes a valve stretching device comprising a spring clasp member 12 and a slidably mounted locking handle member 13 which are utilized to elongate the valve to facilitate insertion thereof into the tire sidewall. Details of the various parts of the tool may be seen in FIGS. 6 through 9.

FIGS. 6 and 7 illustrate one form of the valve engaging tip 7 of the valve inserting tool as well as the arrangement of the key 8 on the shaft 6. The engaging means on the end of shaft 6 comprises a pair of longitudinally extending arms 14 which form a generally U-shaped fork 15. The fork portion slides about the valve body inwardly of one end thereof to grip the valve during the insertion procedure in the manner shown in FIG. 1. In order to prevent damage to the tire carcass by the ends of the fork 15 and to prevent the valve head from slipping out of the fork of the tool, a tip shield or cap 16 is slidably fitted over the fork 15 in the manner illustrated in FIG. 7. To minimize the cross-section of the mass which is to be inserted through the opening in the tire sidewall, the portion of the valve engaging means adjacent the bight of the U is dished or depressed in the manner shown in FIG. 6 to recess the valve head therein. These dished portions or recesses 17 may be made any desired size to accommodate various valves and, if desired, may be extended a distance somewhat greater than the valve head diameter. In this manner, the recesses 17 provide for the retention of valve lubricant and/or adhesive which may be used to ease the insertion of the valve and secure it in place in the sidewall of the tire.

Figure 8:
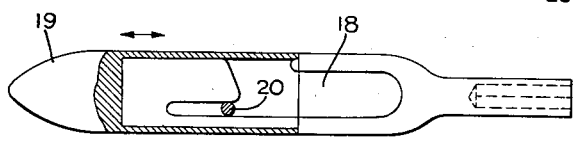
FIG. 8 illustrates a modification of the valve engaging tip of the tool of FIG. 6.

A somewhat different form of the valve engaging portion of the tool is illustrated in FIG. 8. In the form shown, the valve receiving slot 18 is substantially C- shaped with the opening of the C parallel with the longitudinal axis of the tool shaft. In order to minimize the possibility of damage to the tire carcass during insertion of the valve and tool, a tip shield or cap 19, similar to the one shown in FIG. 7, is slidably mounted on the tip. To prevent accidental loss of the shield, it may be provided with a pin 20 which slidably rides in the extreme end of the slot 18 in the manner illustrated in FIG. 8.

While many types of valves such as are used in passenger and light truck tires may be relatively easily inserted using a tool comprising the tipped shaft 6, shield 16 and removable handle 9, according to the present invention a valve stretching attachment is provided, not only to facilitate insertion of the valve and reduce the risk of damage thereto, but also in order to accommodate stiff, less pliable valves encountered in heavier tires. The general arrangement of one form of the valve stretching attachment may be seen in FIG. 1. As previously mentioned, it comprises a spring clasp member 12 which is used to clamp the valve adjacent one head thereof. The member 12 is removably linked to a handle element 13 which is slidably mounted on shaft 6. The handle is provided with conveniently contoured surface to permit "pistol-grip" action in stretching the valve. In addition, the hole 21 through which the shaft 6 passes is sized slightly larger than the shaft and with suitably plane surfaces to permit locking the member 13 in position on the shaft 6 after the valve is stretched by the expedient of tilting the handle 13 so that the edges of the shaft hole 21 frictionally engage and lock onto the shaft 6 in the attitude shown in FIG. 1.

Figure 9:
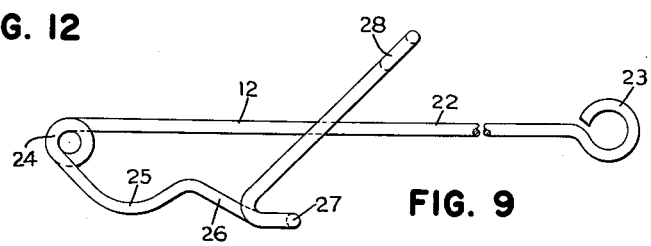
FIG. 9 illustrates a detail of the valve stretching attachment of the tool shown in FIG. 1.

The clasp member 12 may be seen more clearly in FIG. 9 and comprises a longitudinal portion 22 having hook or loop 23 at one end thereof for engaging grip 13. The other end of the longitudinal portion 22 is looped in a plurality of juxtaposed turns 24 to provide spring action of the integral arcuate valve engaging portion 25. A side view of the turns 24 may be seen in FIGS. 1 and 2. An extension 26 of the valve engaging arcuate portion 25 is twisted in a plane substantially orthogonal to the turns 24 to provide a locking bight 27 which snaps around the longitudinal segment to clamp the valve head securely. The action of the locking bight will become apparent from an examination of FIGS. 1, 2 and 9. The bight is then extended at an angle to the longitudinal segment 22 and terminated in a loop 28 to provide a convenient surface against which finger pressure may be exerted to clasp and unclasp a valve between the portions 22 and 25 of the attachment.

Figure 10:
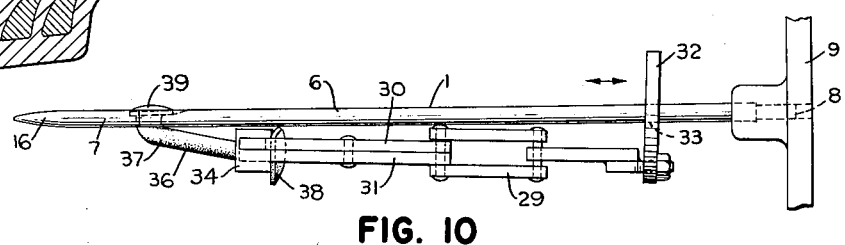
FIG. 10 illustrates a modification of the valve stretching attachment of the tool of FIG. 1.
Figure 11:
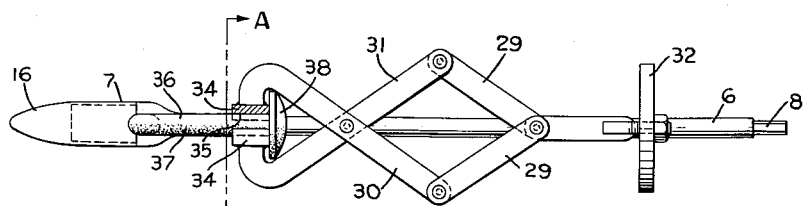
FIG. 11 is an additional view of the tool of FIG. 10.
Figure 12:
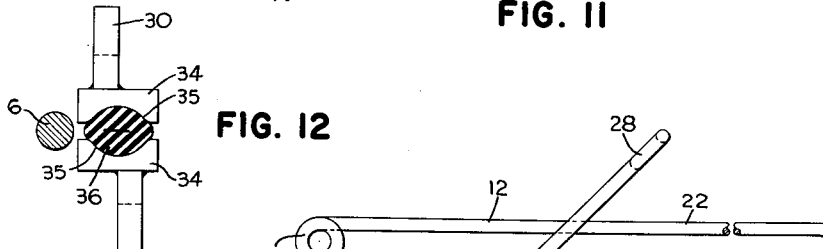
FIG. 12 is a view of the valve gripping portion of the stretching attachment of the tool along the line A—A in FIG. 11.

A somewhat different valve stretching attachment is illustrated in FIGS. 10 and 11. It comprises an intermediate extensible portion comprising tongs 29 having complementary pivotably arranged arms 30 and 31 pivotably attached at one end to a disk 32 which is slidably mounted on shaft 6. The disk 32 is provided with a hole 33 through which the shaft passes and may be locked in position on the shaft after the valve is stretched in the manner previously described. The other end of the arms of the tongs 28 are equipped with a pair of mating valve clamping members 34 having concavely shaped faces 35. The configuration of these members can be clearly seen in FIG. 12 where a valve 36 is shown clamped between the faces 35 of the opposed members 34.

The principal steps comprising the method of inserting a valve in the sidewall of a tire are most easily understood by reference and examination of FIGS. 1 through 5. Referring first to FIG. 5, an elastomeric plug type valve such as is used in sidewall inflated tires is illustrated. The valve comprises a central body portion 37 and two enlarged heads 38 and 39. The heads 38 and 39 assist in retaining the valve in the tire once it has been inserted. A slit 40 passes longitudinally through the valve through which the tire inflating needle is inserted. As is generally the case in such valves, the slit 40 of the valve is held in a closed position to prevent loss of inflating medium by pressure produced on the peripheral walls of the body 37 by the sidewall of the tire. Since the sidewall is normally relatively stiff, it is necessary that the valve body 37 be substantially larger than the hole into which it is inserted in order to achieve the necessary compression to effect a seal. This, of course, creates a problem in inserting the valve, particularly those made of stiff stock such as are necessary in aircraft tires and the like. Mere pressure against a valve to force it into the valve receiving aperture of the tire is not sufficient since the valve body tends to flatten out and pile up at the aperture ahead of the tool. In addition, valve inserting tools of the type which are inserted into the valve slot to urge the valve into the aperture tend to damage the valve under the forces required to insert it. By utilizing a tool made according to the present invention and following the method steps illustrated in FIGS. 1 through 4, it is relatively simple to insert even very stiff valves into comparatively inflexible tire sidewalls.

Figure 4:
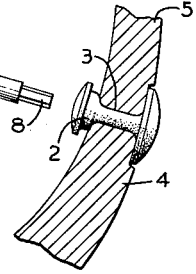
FIG. 4 illustrates a terminal step in inserting the valve.

Referring to FIG. 1, a valve 2 is inserted into the valve engaging tip 7 of the tool previously described with the leading valve head arranged as illustrated and may be lubricated if desired by dipping it into a lubricant. The body of the valve 2 is then clamped in the clasp 12 as illustrated with the gripping portion thereof adjacent and underneath the following head opposite the end inserted in the tip 7. In order to minimize the possibility of damage to the cords in the tire carcass and to insure that the valve does not slip out of the valve engaging slot, the shield 16 should be slipped over the tip 7 prior to stretching the valve and insertion thereof into the sidewall opening. After locking the spring clasp 12 to hold the valve firmly, pressure is exerted on the handle member 13 in the direction of the arrow to elongate the valve 2 and reduce its cross-sectional area. The valve 2 should preferably be stretched to a length greater than the thickness of the tire sidewall 4 for reasons which will subsequently become clear. The handle 13 is then canted slightly to lock on the shaft 6 with the valve extended. The tool 1 is then grasped by the handle 9 and the tip 7 inserted into the valve receiving aperture 3 in the tire sidewall 4. Since it is somewhat enlarged, the shielded tip 7 tends to spread the walls of the aperture 3 to facilitate entry of the leading end of the valve and head while the shield eases insertion and prevents damage to the tire cords. Continuing the advance of the tool 1 draws the valve 2 into the position shown in FIG. 2 until the following end of the valve and spring turns 24 of the clasp member 12 comes into contact with the wall of the tire. The retracted position of the stretching attachment 12 is chosen so that the valve 2 is stretched sufficiently to permit the tip 7 to pass through the aperture 3 and the leading head of the valve to enter the tire chamber as shown in FIG. 2 before the following valve head and end of attachment 12 touches the tire outer wall. When the end of attachment 12 touches the tire and is forced slightly to a rearward position, the handle member 13 is forced out of its canted attitude and the lock between shaft 6 and the walls of hole 21 is automatically released by such movement. The clasp 12 is then unclasped from the valve 2 which snaps towards the tire and assumes a position substantially as shown in FIG. 3. Additional pressure on the tool 1 seats the outer valve head and, as the shaft tip 7 advances, releases the inner head from the valve engaging slot of the tool. The handle 9 and attachment 12 are then slid rearwardly off the shaft 6. In order to avoid displacement or removal of the valve or damage thereto by retraction of the tip 7 through the aperture, the entire shaft is passed on through the aperture as illustrated in FIG. 4 and removed through the tire chamber. The key-shaped slot 11 in the handle 9 may be conveniently used to grip the tip 7 to pull the shaft 6 through the tire wall.

The tool with the modified valve stretching attachment illustrated in FIGS. 10 and 11 may be used in a similar manner as is obvious from its construction. Such a tool has the advantage that retraction of the tongs 29 increases the gripping force of members 34 on the valve body during the valve stretching phase. Furthermore, when the stretching attachment contacts the tire sidewall the resulting slight rearward pressure releases the lock disk 32 from the tool shaft 6 to permit the tension in the tongs 29 to reduce and automatically release the valve which snaps to a position shown in FIG. 2. The advantages of either tool and the method of inserting the valve are obvious from the foregoing, among them being positive positioning of the extended valve in the aperture prior to its release from the inserting tool. In addition, the possibility of damage to the valve or tire is minimized even though substantial forces may be required to insert the valve. Furthermore, pretensioning the valve avoids the problems which occur with conventional tools when the valve body tends to pile up ahead of the tool and also permits inspection of the valve body for flaws prior to insertion in the tire.

While certain representative embodiments and details have been shown for the purpose of illustrating the invention, it will be apparent to those skilled in this art that various changes and modifications may be made therein without departing from the spirit or scope of the invention.

I claim:

1. A tool for inserting an elastomeric valve into a valve receiving opening in the sidewall of a tire comprising a relatively slender shaft, valve engaging means at one end of said shaft for gripping one end of the valve so that the valve may be pushed through said opening by a longitudinal force on said shaft, said shaft being of a maximum cross-section small enough to pass entirely through said opening even with the valve arranged in said opening, means releasably attached to said shaft for application of a force longitudinally of said shaft for inserting said valve in said opening whereby, after insertion of the valve, the shaft may pass entirely through said opening after release of said means from said shaft, and clamp means for releasably gripping the other end of the valve, said clamp means being removably and slidably mounted on said shaft to permit stretching the body of said valve to facilitate insertion thereof into said opening in said tire sidewall.

2. A tool as claimed in claim 1 in which said clamp means includes adjustable elongatable tongs.

3. A tool as claimed in claim 1 in which said clamp means includes an adjustable spring clasp.

4. A tool as claimed in claim 1 including means to releasably lock said clamp means in position on said shaft after said valve has been stretched by retraction of said clamp means along said shaft.

5. A tool for inserting an elastomeric valve into a valve receiving opening in the sidewall of a tire comprising a relatively slender shaft, valve engaging means at one end of said shaft for gripping one end of the valve so that the valve may be pushed through said opening by a longitudinal force on said shaft, said shaft being of a maximum cross-section small enough to pass entirely through said opening even with the valve arranged in said opening, means releasably attached to the other end of said shaft for application of a force longitudinally of said shaft for inserting said valve in said opening whereby, after insertion of the valve, the shaft may pass entirely through said opening after release of said means from said shaft, an adjustable spring clasp for releasably gripping the other end of said valve, said clasp being removably and slidably mounted on said shaft to permit stretching the body of said valve to facilitate insertion thereof into said opening in said tire sidewall, and means to releasably lock said clasp in position on said shaft after said valve has been stretched by retraction of said clasp along said shaft.

6. A tool as claimed in claim 5 in which said valve engaging means comprises longitudinally extending spaced arms forming a U-shaped slot, the open end of which faces outwardly from the engaging end of the tool.

7. A tool as claimed in claim 6 including a separable shield mounted over the valve engaging means to close the open end of said U-shaped slot to provide for easy passage of said tool through said opening and prevent dislodgement of the valve from said slot.

8. A tool as claimed in claim 5 in which said valve engaging means comprises a substantially C-shaped tapered hook with the opening of said C-shape being substantially parallel to the axis of said shaft.

9. A tool as claimed in claim 8 including a separable shield mounted over the valve engaging means to close the opening of said C-shaped hook to provide easy passage of said tool through said opening and prevent dislodgment of the valve from said slot.

References Cited in the file of this patent

UNITED STATES PATENTS

| | | |
|---|---|---|
| 743,963 | Weigele | Nov. 10, 1903 |
| 1,472,812 | Pawsat | Nov. 6, 1923 |
| 1,475,353 | Shapiro | Nov. 27, 1923 |
| 1,519,227 | Urich | Dec. 16, 1924 |
| 2,759,255 | Prince | Aug. 21, 1956 |
| 2,869,408 | Badowski | Jan. 20, 1959 |

UNITED STATES PATENT OFFICE
CERTIFICATE OF CORRECTION

Patent No. 3,034,206                          May 15, 1962

Walter E. Kominic

It is hereby certified that error appears in the above numbered patent requiring correction and that the said Letters Patent should read as corrected below.

Column 2, line 51, for "end" read -- head --.

Signed and sealed this 9th day of October 1962.

(SEAL)
Attest:

ERNEST W. SWIDER
Attesting Officer

DAVID L. LADD
Commissioner of Patents